United States Patent Office 3,317,305
Patented May 2, 1967

3,317,305
BIOCIDAL COMPOSITION CONTAINING AN ELECTROLYTE PLANT NUTRIENT
Andrew Stefcik, Easton, Pa., and Fred E. Woodward, Watchung, N.J., assignors to General Aniline & Film Corporation, New York, N.Y., a corporation of Delaware
No Drawing. Filed Mar. 14, 1963, Ser. No. 265,040
3 Claims. (Cl. 71—3)

This invention relates to stable emulsions of water insoluble liquids in the presence of a large amount of electrolyte material, and more specifically to stable biocidally active emulsions containing a relatively high proportion of inorganic salts suitable as fertilizer material. The use of biocides which includes the various toxicants separately classifiable as insectcides, fungicides, weed killers, insect repellents, nematocides, rodenticides, etc. is very widespread in the agricultural industry, and it is conventional to apply the biocide from a dispersion or emulsion thereof. The more common method of application involves emulsifying a solution of the biocide or the biocide itself where it is already in the liquid state at ambient temperatures in water using a suitable emulsified agent and thereafter spraying the emulsion where needed or desired.

Numerous problems have arisen in using such emulsion systems and most of these are concerned with the stability of the emulsion, especially over long periods of time, leading to undesirable sludge and contaminant formation in spraying equipment.

It has recently been suggested that biocidal compositions be applied with liquid fertilizer compositions, the latter a rather recent innovation, especially in commercial fertilization procedures. The obvious and major advantage of applying the two types of compositions together lies in the savings which result from the efficient use of spraying equipment along with the tremendous savings in labor. As pointed out above, a serious problem in preparing biocidal emulsions lies in the instability of such emulsions, and such a problem is much more severe where there is an additional component as represented by the fertilizer composition. The liquid fertilizer compositions which are of prime importance and which are the types herein contemplated are those which contain relatively high concentrations of electrolyte material and specifically inorganic salts such as ammonium phosphate, ammonium nitrate, and potassium chloride. The high concentration of electrolyte in such fertilizer compositions which may contain 50% or more of dissolved solids in water renders the production of stable emulsions of biocidal materials extremely difficult. Nonionic surface active agents in general do not perform in such systems, due apparently to the destruction of the emulsifying characteristics of the surfactant by the electrolyte. Anionic surface active agents which have heretofore been proposed are either not soluble in electrolyte systems, or are not good emulsifiers.

It is therefore an object of this invention to provide emulsion compositions which are outstandingly stable and which contain relatively high concentrations of electrolyte material.

It is another object of this invention to provide emulsions which are readily formed, have excellent stability and which contain emulsified therein an organic material in the liquid state in the presence of a high concentration of an electrolyte such as an inorganic salt.

It is a still further object of the present invention to provide stable biocide-fertilizer emulsion compositions containing a relatively high concentration of fertilizer.

It is still a further object of the present invention to provide methods for the preparation of stable emulsion compositions containing high concentrations of electrolyte.

It is still another further object of this invention to provide methods for the preparation of stable biocidal-fertilizer emulsion containing a relatively high concentration of inorganic fertilizer salts.

Other objects will appear hereinafter as the description proceeds.

It has now been discovered that the attainment of the above objects can be achieved by the use of certain phosphate esters as emulsifiers for the water-insoluble organic material in the aqueous electrolyte solution. The emulsion compositions which are herein contemplated comprise as the essential ingredient thereof the following:
(a) Water,
(b) Water-insoluble organic material present in the liquid state,
(c) Electrolyte, and
(d) Phosphate ester emulsifier.

The water-insoluble organic material may be any organic material which is a liquid at ambient temperatures, or may be any water-insoluble compound or compounds dissolved in a suitable organic solvent to effect the production of the compound or compounds in the liquid state. The preferred organic materials are biocides of the types above described and illustrative of such compounds are the following:

TABLE I

| Trade Name | Chemical Name |
|---|---|
| DDT | 2,2-bis(para-chlorophenyl)-1,1,1-trichloroethane. |
| DDD | 2,2-bis(p-chlorophenyl)-1,1-dichloroethane. |
| 2,4-D and esters | 2,4-dichlorophenoxyacetic acid. |
| 2,4,5-T and esters | 2,4,5-trichlorophenoxyacetic acid. |
| Toxaphene | Chlorinated canphene (67-69% chlorine). |
| Chlordane | 60% of 1,2,4,5,6,7,8,8-octachloro-4,7-methano-3a,4,7,7a-tetrahydroindane. |
| Dilan | 1/3 of 2-nitro-1,1-bis(p-chlorophenyl)propane and 2/3 of 2-nitro-1,1-bis(p-chlorophenyl)butane. |
| Nicotine sulphate | 1-methyl-2-pyridyl-pyrrolidone sulphate. |
| Dieldrin | Contains 85% of 1,2,3,4,10,10-hexachloro-6,7-epoxy-1,4,4a,5,6,7,8,8a-octahydro-1,4,5,8-dimethanonaphthalene. |
| Lindane | 1,2,3,4,5,6-hexachlorocyclohexane (99% gamma isomer). |
| B.H.C | Mixed isomers of 1,2,3,4,5,6-hexachlorocyclohexane. |
| C.P.R | 5.1% piperonyl cyclonene, 0.51% pyrethrum, 2.55% rotenone. |
| I.P.C | Isopropyl N-phenyl carbamate. |
| Chloro I.P.C | Isopropyl-N-(3-chlorophenyl) carbamate. |
| Methoxychloro | 1,1,1-trichloro-2,2-bis(p-methoxyphenyl) ethane. |
| Aldrin | 95% of 1,2,3,4,10,10-hexachloro-1,4,4a,5,8,8a-hexahydro-1,4,5,8-dimethanonaphthalene. |
| Parathion | o,o-Diethyl-1,p-nitrophenylthiophosphate. |

It is of course clear that one may employ any of the aforementioned alone or in admixture in any proportions as well as any other suitable water-insoluble organic compounds which it is desired to emulsify in the highly concentrated aqueous electrolyte.

Where, as pointed out above, the water-insoluble organic compound is a solid, then a suitable organic solvent is necessary to effect the formation of the liquid state necessary in the production of an emulsion. Obviously the particular organic solvent is not critical, and any suitable solvent can be used whether aromatic, aliphatic, cycloaliphatic or heterocyclic in nature.

Generally, but not necessarily, the preferred solvents are aromatic mainly because of their ready availability and low cost. Examples of suitable aromatic solvents are benzene, toluene, xylene, as well as those commercial products which are primarily hydrocarbon in nature and which contain a high aromatic content and are usually derived from petroleum products. Examples of such solvents are "Velsicol AR-50G" and "Panasol AN-2K." The properties of these are, respectively:

VELSICOL AR-50G

Specifications:

| | | |
|---|---|---|
| A.P.I. gravity at 60° F. | | 15.5–19.0 |
| Weight per gallon at 60° F. | | 7.88–8.02 |
| Specific gravity at 60° F. | | 0.947–0.963 |
| Color (union scale) | | 1–2 |
| Flash point (C.O.C.) | ° F. | 180 |
| Viscosity SSU at 100° F. | sec. | 30–40 |
| Mixed aniline point | ° C. max. | 25 |
| Kauri butanol value—mixed (toluol=105) | | 80 |

Distillation range:

| | | |
|---|---|---|
| I.B.P. | ° F. min. | 390 |
| 10% | ° F. | 430–450 |
| 50% | ° F. | 460–480 |
| 90% | ° F. | 510–530 |
| E.P. | ° F. max. | 550 |

PANASOL AN-2K

| | |
|---|---|
| Distillation: | |
| 2F., ASTM | D–158 |
| I.B.P., ° F. | 398 |
| E.P., ° F. | 525 |
| D.P., ° F. | — |
| Specific gravity, 60/60 ° F. | 0.950 |
| Aromatics, vol. percent | 82 |
| Mixed aniline point, ° F. | 75 |
| Flash point, C.O.C., ° F. | 200 |
| Flash point, TCC., ° F. | — |

Other suitable solvents include the commercially available kerosenes, mineral spirits and such products as the Solvessos and the like.

The fertilizer compositions comprise in general, as mentioned above, relatively concentrated aqueous solutions of inorganic salts which supply the necessary nutrient materials, namely, nitrogen, phosphorus and potassium, and the most economical sources of these are ammonium nitrate, ammonium phosphate and potassium chloride. Other sources of nutrient materials may be present in the aqueous solution, and among such additional nutrients mention may be made of urea which is an extremely valuable source of nitrogen but which it is recognized is not an electrolyte. The aqueous fertilizer compositions may be either neutral or substantially neutral, for example, a mixture of urea and potassium chloride, or acidic in nature, and containing additionally, phosphate salts and excess phosphoric acid. The usual procedure for preparing liquid fertilizer compositions containing phosphorus is to react aqueous ammonia with an excess of phosphoric acid. Such compositions will have pH's within the acid range.

The final and critical component of the emulsion compositions of the present invention is the phosphate ester emulsifier. The phosphate esters which are employed in the present invention are esters of nonionic surface active agents and are characterized as mono- and di-esters and mixtures thereof of such nonionic hydroxy containing surfactants. The nonionic precoursers for the phosphate esters are well known and are those compounds which are derived from the interaction of at least one mole of an alkylene oxide with one mole of an organic compound containing at least six carbon atoms and a reactive hydrogen atom. Such reactive compounds include phenols, and aliphatic alcohols as disclosed, for example, in U.S. Patents 2,213,477 and 1,970,578, mercapto compounds such as dodecyl mercaptan, oleyl mercaptan, cetyl mercaptan, thiophenol and thionaphthol as disclosed, for example, in U.S. Patent 2,205,021, carboxylic acid amides, as disclosed in U.S. Patent 2,085,706, sulfonamides as disclosed in U.S. Patent 2,266,141, compounds designated as "Pluronics" as disclosed in U.S. Patent 2,674,619, among others, amines.

As is pointed out in these patents, and as is well known in the art, the nonionic surface active agents which are obtained by the interaction of reactive hydrogen containing organic compounds and alkylene oxides may employ as the alkylene oxide, ethylene oxide, propylene oxide, butylene oxide, or compounds which yield such oxides or react as such oxides, such as epichlorohydrin and the like.

While the nonionic surface active agents which may be used may contain as little as one oxyethylene group, it is preferred to employ those condensation products which contain an average of about at least 20% alkylene oxide of a hydrophilic nature and up to a maximum of about 85% alkylene oxide of a hydrophilic nature. Where ethylene oxide is employed and the resultant condensate contains oxyethylene groups, the above range would obtain. Where the higher alkylene oxides are employed, a suitable balance with ethylene oxide should be used such that the resultant condensation product contains sufficient oxyethylene groups to confer the hydrophilic characteristics equivalent to a content of 20 to 85% ethylene oxide. In other words, while the minimum of 20% ethylene oxide is stated above as necessary to confer a sufficient degree of hydrophilic characteristics to obtain the necessary phosphate esters which are useful in the present invention, it is possible by employing a mixture of alkylene oxides to lessen the requirement for the minimum ethylene oxide content of 20%. To illustrate this point, one may employ a mixture of ethylene oxide and propylene oxide with a selected phenol such as nonyl phenol whereby the resultant condensation product contains 15% oxyethylene groups and 15% oxypropylene groups, the former as the terminating groupings. This combination would confer sufficient hydrophilic characteristics to render the corresponding phosphate esters efficacious in the emulsion compositions of the present invention. In no case should less than about 10% ethylene oxide be used.

The phosphate esters used in the present invention may be prepared by numerous techniques. The preferred method involves the reaction of one mole of $P_2O_5$ with 2 to 4.5 moles of the nonionic surfactant as described and claimed in U.S. Patent 3,004,056 by Nunn and Hesse and U.S. Patent 3,004,057 by Nunn. As described in the said Nunn and Hesse patent, the reaction between the $P_2O_5$ and the nonionic polyoxyalkylene ether is conducted under substantially anhydrous conditions and at a temperature below about 110° C. In its preferred form, the reaction is carried out by adding the $P_2O_5$ gradually, with vigorous agitation to the nonionic surface active agent in liquid form. The reaction is exothermic and cooling is in some cases necessary to keep the temperature below 110° C., since discolored and darkened products tend to be produced above this temperature. The reaction proceeds continuously during the addition of the $P_2O_5$ and is preferably followed by maintenance of the reaction mixture at ambient temperatures up to 110° C. for an additional period of time after completion of such addition to allow for complete solution of the $P_2O_5$ and reaction with the nonionic surface active agent.

The following examples illustrate the preparation of such phosphate esters.

Example A 2.7 moles of a nonionic surface active compound derived from dinonyl phenol condensed with 4 moles of ethylene oxide is reacted with 1 mole of $P_2O_5$ in the manner described in the examples of U.S. Patent 3,004,056. The product consists of about equal amounts of mono- and di-ester with about 10–15% unreacted nonionic.

Example B

The procedure of Example A is repeated except that the nonionic compound is derived from the interaction of nonyl phenol with 1.5 moles of ethylene oxide (ethylene oxide content of condensate 29.2%).

Example C

The procedure of Example B is repeated except that 6.0 moles of ethylene oxide are condensed to yield a nonionic containing 54.5% ethylene oxide.

Example D

Example B is again repeated except that about 10 moles of ethylene oxide are reacted to yield a condensation product containing about 64% ethylene oxide.

Example E

Example A is again repeated except that the reaction is carried out between tridecyl alcohol (obtained by the oxo process from using triisobutylene) and 9.75 moles of ethylene oxide to yield a product containing 68% ethylene oxide.

Example F

The procedure of Example A is repeated except that the nonionic is a dodecyl phenol plus 2 moles of ethylene oxide condensate.

Example G

The procedure of Example A is again repeated employing as the nonionic surface active agent a dinonyl phenol plus 5 moles ethylene oxide (40% ethylene oxide content).

Example H

The procedure of Example A is once again repeated employing as the surfactant a dinonyl phenol plus 7 moles ethylene oxide (47% ethylene oxide content).

Example I

The procedure of Example A is still once again repeated employing as the nonionic surface active agent dinonyl phenol reacted with 1.5 moles of ethylene oxide to yield a nonionic product containing about 20% ethylene oxide.

Example J

The above procedures are again repeated using as the nonionic precursor the condensation product of dodecyl phenol with 1.8 moles of ethylene oxide.

Example K

In the following examples the procedure of Example A is repeated using the indicated nonionic compounds:

(1) n-hexyl alcohol+2 E.O.[1]
(2) iso-octyl alcohol+2.5 E.O.
(3) nonyl alcohol+3 E.O.
(4) dodecyl mercaptan+2 E.O.
(5) dodecyl mercaptan+9 E.O.
(6) cetyl mercaptan+4 E.O.
(7) dinonyl phenol+9.6 E.O.
(8) dinonyl thiophenol+6 E.O.
(9) soya bean oil amine+10 E.O.
(10) rosin amine+15 E.O.
(11) iso-octyl amine+8 E.O.
(12) dodecyl benzene sulfonamide+10 E.O.
(13) decyl sulfonamide+6 E.O.
(14) oleic acid+15 E.O.
(15) stearic acid+12 E.O.
(16) stearamide+8.5 E.O.
(17) tetradecylbenzamide+12 E.O.
(18) polypropylene glycol (average M.W.=750)+2 E.O.
(19) polypropylene glycol (average M.W.=400)+6 E.O.
(20) dinonyl phenol+15 E.O.

The chemical constitution of the products produced in the above described examples will usually be about 20 to 50% of the secondary phosphate ester of the nonionic agent, 30 to 80% of the primary phosphate ester, and 0 to 40% of unreacted nonionic agent.

By carrying out the above reaction in the presence of a small amount of a phosphorus-containing compound

[1] Ethylene oxide.

selected from the group consisting of hypophosphorous acid, salts of hypophosphorous acid, phosphorous acid, and salts and esters of phosphorous acid, preferably sodium hypophosphite or hypophosphorous acid, as described in said Nunn '057 patent, lighter colored or substantially colorless reaction products are obtained.

While the presence of unreacted nonionic is not detrimental to the attainment of the objects of the present invention, the amount of nonionic can be reduced, if desired, to a minimum of less than about 10% by incorporating in the reaction mixture, a small amount of mineral acid such as phosphoric acid, hydrochloric acid or sulfuric acid. Since phosphorous pentoxide yields phosphoric acid in the presence of water, the latter can advantageously and preferably be used to form the acid "in situ." With the use of the mineral acid the amount of phosphorous pentoxide can also be increased to as much as 3 moles per mole of nonionic reactant, thereby favoring the formation of the monoester in major amounts, i.e., substantially no diester.

Monoesters and diesters can also be prepared from the corresponding triesters by reacting the triester with phosphoric acid. By varying the ratio of nonionic to acid, one can prepare either mono- or di-ester to the substantial exclusion of the other. A high ratio of triester to acid (2:1) produces diester whereas a low ratio (0.5:1) produces monoester.

Example L

Equimolar amounts of the nonionic surface active compound of Example A and phosphorous pentoxide are heated at 90° C., while adding in the presence of about 0.4% water the $P_2O_5$ over a period of one hour. Then the reaction mixture is heated for 4 hours at 125° C. The final product is a monoester.

Example M

Example L is repeated employing one mole of a dodecyl phenol plus 2 moles ethylene oxide condensate and two moles of $P_2O_5$. The final product is a monoester.

Example N

Example L is again repeated using the following nonionics:

(A) octadecanol+3 moles ethylene oxide
(B) hexadecanol+4 moles ethylene oxide
(C) 1-eicosanol+6 moles ethylene oxide
(D) 1-dotriacontenol+7 moles ethylene oxide
(E) dodecyl phenol+5 moles ethylene oxide
(F) hexadecyl phenol+3 moles ethylene oxide
(G) tri-n-octyl phenol+4 moles ethylene oxide
(H) tri-n-octyl phenol+5 moles propylene oxide
(I) dodecyl phenol+3 moles propylene oxide
(J) dinonyl phenol+1.5 moles propylene oxide
(K) diisohexyl phenol+2 moles propylene oxide
(L) tri-n-butyl phenol+2 moles propylene oxide
(M) tri-n-butyl phenol+3 moles propylene oxide
(N) tri-n-butyl phenol+4 moles propylene oxide
(O) tri-n-butyl phenol+3 moles ethylene oxide
(P) hexadecanol+3 moles propylene oxide
(Q) octadecanol+4 moles propylene oxide
(R) butyl hexyl phenol+4 moles ethylene oxide
(S) ethyl heptyl phenol+5 moles ethylene oxide
(T) ethyl heptyl phenol+3 moles propylene oxide
(U) ceryl alcohol+2 moles ethylene oxide
(V) 1-octacosanol+4 moles ethylene oxide
(W) 1-nonacosanol+7 moles ethylene oxide
(X) 1-triacontanol+6 moles ethylene oxide
(Y) 1-tetratriacontanol+5 moles ethylene oxide
(Z) 1-tetratriacontanol+2 moles propylene oxide

Example O

A phosphate triester of the nonionic compound of Example A is prepared by reacting 3 moles of said nonionic with 1 mole of phosphorous oxychloride in the presence of 1 mole of pyridine and 100 ml. of benzene. The POCl₃ is added dropwise to the other components at a temperature of about 0° C. and the temperature is held below 10° C. After all of the POCl₃ has been added, the mixture is refluxed for 3 hours and then the solvent is removed under vacuum distillation. The triester results.

The triester is converted to a monoester by adding 1 mole of phosphoric acid to 0.5 mole of the triester at about room temperature. The monoester results.

*Example P*

Example O is repeated except that 2 moles of triester are used in lieu of 0.5 mole. The diester results.

The mono- and di-phosphated products may be represented by the following formulae:

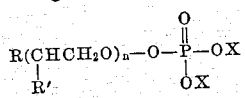

and

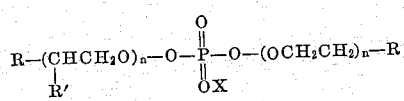

wherein R' represents H, or methyl; X may be hydrogen, alkali metal, alkaline earth metal, e.g., calcium, magnesium, barium, etc., ammonium or substituted ammonium, and $n$ equals the number of moles of alkylene oxide necessary to yield a final product containing up to 50% by weight of the said alkylene oxide as discussed above; R is the hydrophobe nucleus.

Examples L, O and P are repeated using the nonionics of Examples K(1), K(2), K(4), K(8), K(9), K(10), K(13), K(14), K(16), K(17) and K(19).

*Example Q*

Example E is repeated using 6 moles of ethylene oxide to yield a product containing about 57% ethylene oxide.

*Example 1*

A concentrate containing:

| | Percent |
|---|---|
| Butoxyethyl ester of 2,4-D | 63 |
| Heavy aromatic naphtha solvent | 32 |
| Phosphate ester of Example E (as free acid) | 5 | is prepared. 10 cc. of this concentrate is added to 90 cc. of Uran (Allied Chemical and Dye Co. trademark for urea-ammonium nitrate fertilizer) which contains 35.4% urea, 44.3% ammonium nitrate and 20.3% water. A stable emulsion is produced.

*Example 2*

Example 1 is repeated except that in place of the free acid form of the phosphate ester, the ethylene diamine salt is used. A stable emulsion results.

*Example 3*

A concentrate is prepared as in Example 1 using, however, 5% of the product of Example K(20). This concentrate (10 cc.) is added to 90 cc. of a 9–9–9[1] liquid fertilizer prepared from:

| | Pts. |
|---|---|
| Aqueous ammonia (29%) | 12.5 |
| Phosphoric acid (85%) | 14.7 |
| Urea | 13.3 |
| Potassium chloride | 14.5 |
| Balance water to total of 100 pts. | |

A well and excellently stabilized emulsion results.

*Example 4*

A concentrate is prepared containing:

| | Percent |
|---|---|
| Nemagon soil fumigant (Shell dibromochloropropane) | 45 |
| Heavy aromatic solvent | 45 |
| Product of Example K(20) | 10 |

[1] N%–P% (as P₂O₅)–K% (as K₂O).

10 cc. of this concentrate is added to 90 cc. of Uran. A stable emulsion is produced which shows very little separation after 24 hours and redispersing is very easy.

*Example 5*

Example 4 is repeated using 10% of a 3.1 mixture of the product of Example K(20) and the product of Example K(7). Excellent, stable emulsions are produced.

*Example 6*

10 cc. of the concentrate of Example 4 is added to 90 cc. of a liquid 5–10–5 fertilizer. The latter contains:

| | Percent |
|---|---|
| Aqueous NH₃ (29%) | 13 |
| Phosphoric acid (85%) | 18.5 |
| Urea | 3.7 |
| KCl | 16.1 |
| Balance water to 100%. | |

A well stabilized emulsion results.

*Example 7*

Example 6 is repeated using the concentrate of Example 5. Excellent emulsion stability is achieved.

*Example 8*

In the following Table I, properties of emulsions are given using 2 cc. of emulsion concentrate in 98 cc. of Uran. The concentrate contains:

| | Parts |
|---|---|
| Aldrin | 26.3 |
| Xylene | 31.6 |
| Kerosene | 31.6 |
| Emulsifier | 10.0 |

TABLE I

| Emulsifier | Initial Emulsifiability with Slight Agitation | Emulsion appearance after— | | Remulsification |
|---|---|---|---|---|
| | | 1 hr. | 24 hrs. | |
| Example K(20) | Fair | 2 CO[1] 98 E[2] | 2 CO 98 C | 2 CO 98 E |
| Example C | Good | 4 C[3] 96 E | 4 C 96 E | 4 C |
| Example Q | Good | 100 E | 2 C 98 E | 100 E |
| Example E | Fair | 4 C 96 E | 4 C 96 E | 2 C 98 E |
| Example D | Fair | 4 C 96 E | 4 C 96 E | 2 C 98 E |
| Example C as 90% Sodium Salt. | Fair | 2 O[4] 2 C 96 E | 4 O 96 E | 4 O 96 E |

[1] CO—Cream-oil. [2] E—Emulsion. [3] C—Cream. [4] O—Oil.

*Example 9*

Example 8 is repeated except that the fertilizer is an 8–24–0 composition and contains:

| | Parts |
|---|---|
| Aqueous ammonia (29%) | 33.3 |
| Phosphoric acid (85%) | 44.5 |
| Balance water to 100 parts. | |

The emulsions are similar to those of Example 8.

*Example 10*

2 cc. of the emulsion concentrates of Example 8 are added to 98 cc. of the liquid fertilizer composition of Example 6. The results are stable emulsions as in Example 8.

*Example 11*

2 cc. of the emulsion concentrates of Example 8 with emulsifiers of Examples D and K(20) are added to a fertilizer composition (8–8–8) which contains:

| | Percent |
|---|---|
| Aqueous ammonia (29%) | 11.1 |
| Phosphoric acid (85%) | 13 |
| Urea | 11.8 |
| Potassium chloride | 12.9 |
| Balance water to 100%. | |

Excellent emulsions form initially, which remain well stabilized.

Example 12

2 cc. of the emulsion concentrates of Example 8 with emulsifiers of Examples D, Q, K(20) and that used in Example 5 are added to the 9–9–9 fertilizer of Example 3. Excellent, stable emulsions are produced.

Example 13

A concentrate is prepared containing:

| | Percent |
|---|---|
| Heptachlor | 32.5 |
| Xylene | 57.2 |
| Emulsifier | 10.0 |

2 cc. of the above concentrate containing, separately, the emulsifiers of Examples D, E, K(7), K(20), Q and that used in Example 5 are added to urane. Excellent and stable emulsions are produced.

Example 14

The concentrate of Example 13 (2 cc.) is added to the fertilizer composition of Example 3. The emulsifiers used are those of the following examples: D E, K(5), K(9), K(12), K(14), and K(20). Excellent, stable emulsions are produced.

Example 15

2 cc. of the concentrates of Example 13 each, separately, containing the emulsifiers of Examples D, K(3), K(7), K(10), K(12), K(15), K(19), K(20), N(C), N(H), N(Q), N(R), P [using nonionics of Examples A, K(8), K(9), K(10), K(14), K(17) and K(19)].

Example 16

Example A is repeated using mol ratios of nonionic to $P_2O_5$ of:

(a) 2.0:1  (e) 3.5:1
(b) 2.3:1  (f) 4.0:1
(c) 2.5:1  (g) 4.3:1
(d) 3.0:1  (h) 4.5:1

Example 17

Examples C, D, E, G, H, K(7), K(14), K(16) and K(20) are repeated using the various ratios of nonionic to $P_2O_5$ of Example 16. These examples are as follows:

| Example 17 | Ratio of Example 16 | Nonionic of Example |
|---|---|---|
| (a) | (a) | C |
| (b) | (b) | C |
| (c) | (c) | C |
| (d) | (d) | C |
| (e) | (e) | C |
| (f) | (f) | C |
| (g) | (g) | C |
| (h) | (h) | C |
| (i) | (a) | D |
| (j) | (b) | D |
| (k) | (c) | D |
| (l) | (d) | D |
| (m) | (e) | D |
| (n) | (f) | D |
| (o) | (g) | D |
| (p) | (h) | D |
| (q) | (a) | E |
| (r) | (b) | E |
| (s) | (c) | E |
| (t) | (d) | E |
| (u) | (e) | E |
| (v) | (f) | E |
| (w) | (g) | E |
| (x) | (h) | E |
| (y) | (a) | G |
| (z) | (b) | G |
| (aa) | (c) | G |
| (bb) | (d) | G |
| (cc) | (e) | G |
| (dd) | (f) | G |
| (ee) | (g) | G |
| (ff) | (h) | G |
| (gg) | (a) | H |
| (hh) | (b) | H |
| (ii) | (c) | H |
| (jj) | (d) | H |
| (kk) | (e) | H |
| (ll) | (f) | H |
| (mm) | (g) | H |
| (nn) | (h) | H |
| (oo) | (a) | K(7) |
| (pp) | (b) | K(7) |
| (qq) | (c) | K(7) |
| (rr) | (d) | K(7) |
| (ss) | (e) | K(7) |
| (tt) | (f) | K(7) |
| (uu) | (g) | K(7) |
| (vv) | (h) | K(7) |
| (ww) | (a) | K(14) |
| (xx) | (b) | K(14) |
| (yy) | (c) | K(14) |
| (zz) | (d) | K(14) |
| (aaa) | (e) | K(14) |
| (bbb) | (f) | K(14) |
| (ccc) | (g) | K(14) |
| (ddd) | (h) | K(14) |
| (eee) | (a) | K(16) |
| (fff) | (b) | K(16) |
| (ggg) | (c) | K(16) |
| (hhh) | (d) | K(16) |
| (iii) | (e) | K(16) |
| (jjj) | (f) | K(16) |
| (kkk) | (g) | K(16) |
| (lll) | (h) | K(16) |
| (mmm) | (a) | K(20) |
| (nnn) | (b) | K(20) |
| (ooo) | (c) | K(20) |
| (ppp) | (d) | K(20) |
| (qqq) | (e) | K(20) |
| (rrr) | (f) | K(20) |
| (sss) | (g) | K(20) |
| (ttt) | (h) | K(20) |

Example 18

Examples 17a through 17ttt are tested in Uran and the fertilizer compositions of Examples 3 and 6. Excellent, stable emulsions are produced.

Example 19

Example 1 is repeated except that the concentrate contains only 1% of emulsifier. A fairly stable emulsion is produced.

It is surprising that extremely stable emulsions of the type herein contemplated can be produced especially under highly acid conditions. The property of the anionic phosphate ester emulsifiers which permits the production of stable emulsions at low pH's (on the acid side) is indeed remarkable especially in the presence of electrolyte material in view of the fact that anionics in acid media generally are poor emulsifiers under similar conditions. Another outstanding advantage of the anionic phosphate ester emulsifiers is their high solubility in aqueous media containing a high concentration of electrolyte. This permits emulsification of materials which require relatively high concentration of emulsifier (i.e., 1 to 5%). In general, therefore, one may use the emulsifier in any concentration required for the necessary degree of emulsion stability. Amounts from about 0.1% to about 10% may, thus, be used with the preferred range being about 0.2% to about 5% by weight based on the weight of the total emulsion. Further, while the phosphate esters are outstanding emulsifiers, their unexpected utility with electrolyte systems as herein disclosed is particularly significant with electrolyte concentrations above about 10% and preferably from about 15% to about 50%.

While only specific electrolytes and insoluble organic compounds have been exemplified, it is clear that other electrolytes may be used along with the general class of water-insoluble organic compounds to achieve the outstanding emulsion compositions of this invention. The amounts of insoluble organic material are obviously not critical and may vary from a fraction of 1% (e.g., 0.1%) to as much as about 85% of the total composition. Any of the aforementioned materials may be used along with other modifications obvious to those skilled in the art, without departing from the spirit or scope of this invention.

We claim:

1. A stable, readily remulsifiable composition comprising components:

(a) at least about 0.1% of a water-insoluble organic biocide present as a solution in an organic solvent, (b) water,
(c) from about 10% to about 50% by weight of a water-solute electrolyte plant nutrient, and
(d) at least about 0.1% of a phosphate ester of a nonionic surface active agent, said ester selected from the class consisting of mono- and di-phosphate esters and mixtures thereof, said nonionic surface active agent having the molecular configuration of a condensation product of
(e) a phenol and
(f) at least one mole of an alkylene oxide, the said nonionic surface active agent containing at least 10% by weight of ethylene oxide.

2. A stable, readily remulsifiable composition comprising components:
(a) at least about 0.1% of a water-insoluble organic biocide present as a solution in an organic solvent,
(b) water,
(c) from about 10% to about 50% by weight of a water-solute electrolyte plant nutrient, and
(d) from about 0.1% to about 10% by weight of a phosphate ester of a nonionic surface active agent, said ester selected from the class consisting of mono- and di-phosphate esters and mixtures thereof, said nonionic surface active agent having the molecular configuration of a condensation product of
(e) a phenol and
(f) at least one mole of an alkylene oxide, the said nonionic surface active agent containing at least 10% by weight of ethylene oxide.

3. A stable, readily-remulsifiable composition comprising components
(a) at least about 0.1% of a water-insoluble organic biocide present as a solution in an organic solvent,
(b) water
(c) from about 10% to about 50% by weight of a water-solute electrolyte plant nutrient, and
(d) at least about 0.1% of a phosphate ester of a nonionic surface active agent, said ester selected from the class consisting of mono- and di-phosphate esters and mixtures thereof, said nonionic surface active agent having the molecular configuration of a condensation product of
(e) a phenol or aliphatic alcohol containing at least six carbon atoms and
(f) at least one mole of an alkaline oxide, the said nonionic surface active agent containing at least 10% by weight of ethylene oxide.

References Cited by the Examiner

UNITED STATES PATENTS

| | | | |
|---|---|---|---|
| 2,845,380 | 7/1958 | Mayhew | 167—42 |
| 2,976,211 | 3/1961 | Linder | 71—2.3 X |
| 3,004,056 | 10/1961 | Nunn et al. | 260—461 |
| 3,004,057 | 10/1961 | Nunn et al. | 260—461 |
| 3,074,791 | 1/1963 | Scoles | 71—2.6 |

LEWIS GOTTS, *Primary Examiner.*

JAMES O. THOMAS, *Assistant Examiner.*

PO-1050
(5/69)

UNITED STATES PATENT OFFICE
CERTIFICATE OF CORRECTION

Patent No. 3,317,305            Dated May 2, 1967

Inventor(s) ANDREW STEFCIK ET AL

It is certified that error appears in the above-identified patent and that said Letters Patent are hereby corrected as shown below:

Column 8, line 12, "5-10-5" should read -- 5-10-10 -- . Column 9, line 23, a comma should appear after "D". Column 12, line 16, "alkaline" should read -- alkylene -- ; line 24, "Linder" should read -- Lindner -- .

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents